(12) United States Patent
Kurohata et al.

(10) Patent No.: US 7,137,916 B2
(45) Date of Patent: Nov. 21, 2006

(54) MOVABLE GUIDE FOR TRANSMISSION DEVICE

(75) Inventors: Junya Kurohata, Osaka (JP); Atsushi Kumakura, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 542 days.

(21) Appl. No.: 10/718,958

(22) Filed: Nov. 21, 2003

(65) Prior Publication Data

US 2004/0147350 A1  Jul. 29, 2004

(30) Foreign Application Priority Data

Jan. 28, 2003  (JP) .............................. 2003-019111

(51) Int. Cl.
F16H 7/08 (2006.01)
F16H 7/18 (2006.01)

(52) U.S. Cl. ...................................... 474/111; 474/140

(58) Field of Classification Search ................ 474/111, 474/140, 101, 109
See application file for complete search history.

(56) References Cited

U.S. PATENT DOCUMENTS 6,849,013 B1 *  2/2005  Konno et al. ................ 474/111
2002/0128100 A1  9/2002  Inoue et al.
2003/0064842 A1 *  4/2003  Konno et al. ................ 474/111
2003/0064843 A1 *  4/2003  Konno ........................ 474/111
2003/0078120 A1 *  4/2003  Konno ........................ 474/111

FOREIGN PATENT DOCUMENTS

| EP | 1030078 A2 * | 8/2000 |
| JP | 02-011830 | 1/1990 |
| JP | 2002-266964 | 9/2002 |
| JP | 2003-113912 A * | 4/2003 |

* cited by examiner

Primary Examiner—Marcus Charles
(74) Attorney, Agent, or Firm—Howson and Howson

(57) ABSTRACT

In a pivoting guide for a traveling transmission chain, composed of a synthetic resin body having a shoe and a slotted reinforcement, and a plate fitting into the slot, the plate has a mounting hole received on a boss formed on the guide body and coaxial with a mounting hole on the guide body which receives a pivot shaft. This structure facilitates assembly and mounting because the plate is securely attached to the guide body before the assembly is mounted. The plate does not contact the pivot shaft, and therefore full advantage is taken of the self-lubricating property of the synthetic resin. The boss may be elongated so that the length of the mounting hole of the guide body is greater than the width of the shoe so that wear in of the guide body due to biased loads is dispersed, and the useful life of the guide is extended.

2 Claims, 10 Drawing Sheets

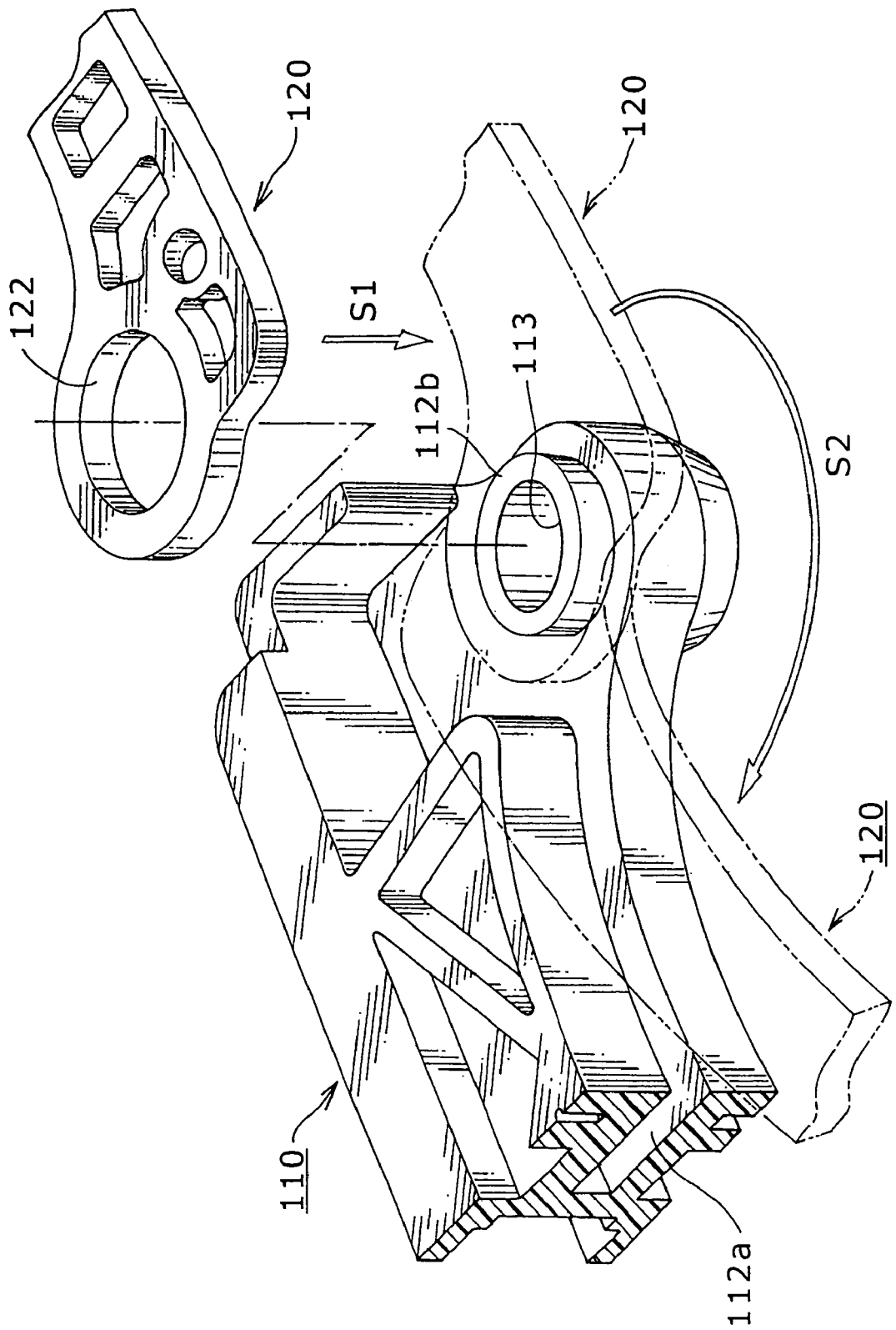

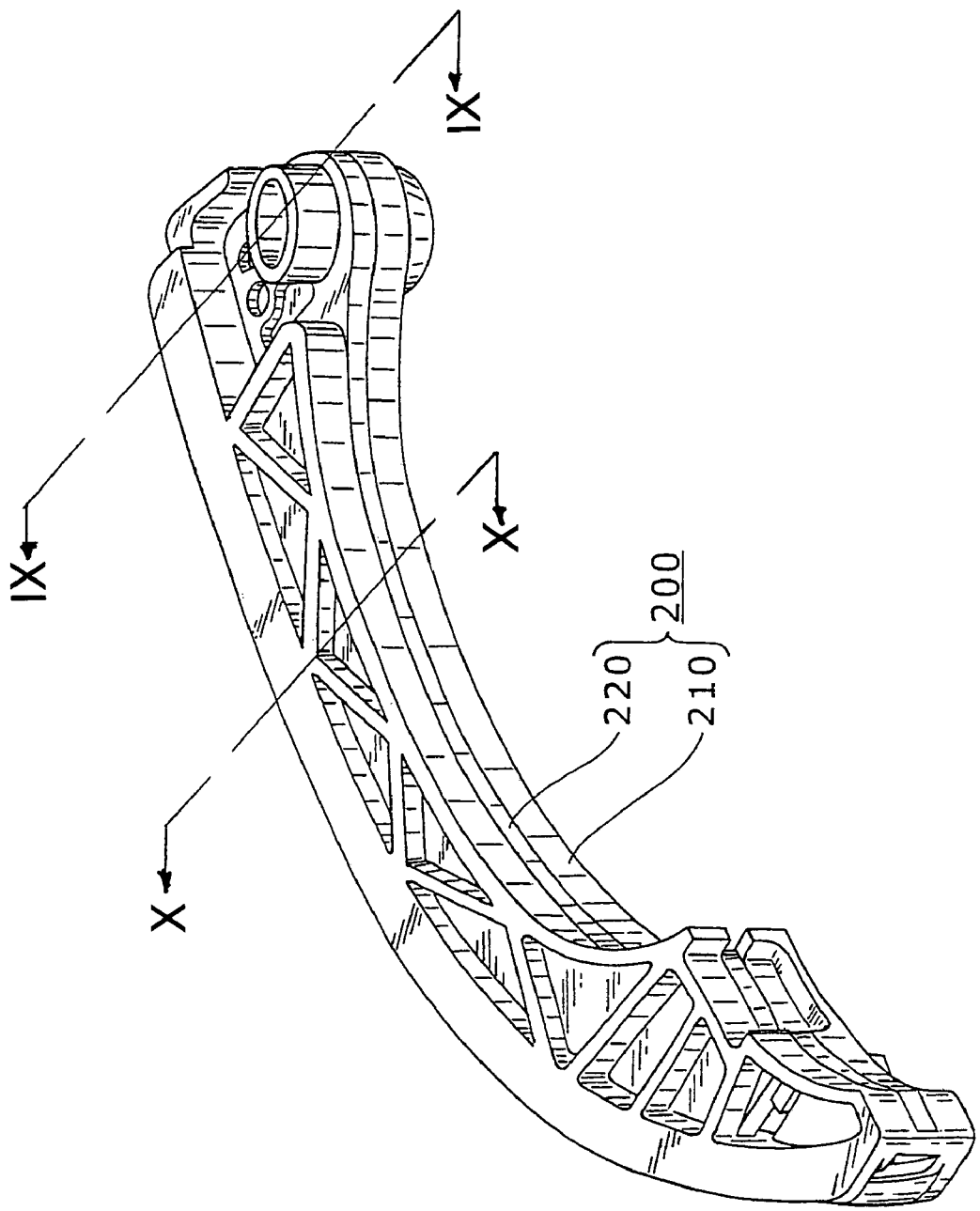

Fg.7(a)
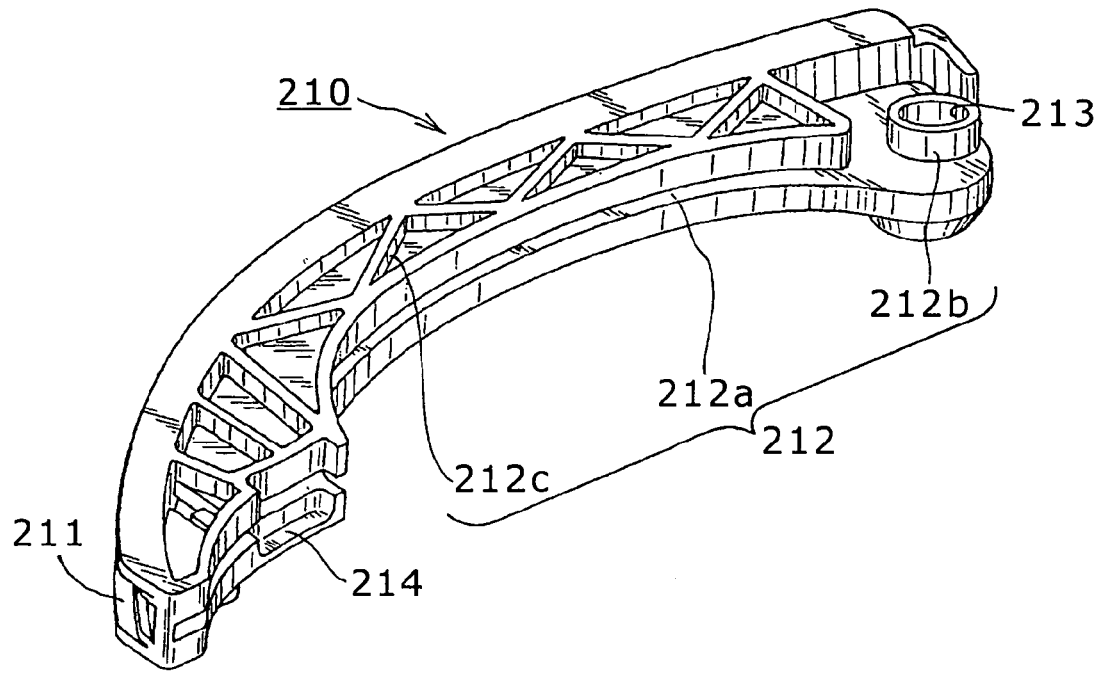
Fig.7(b)
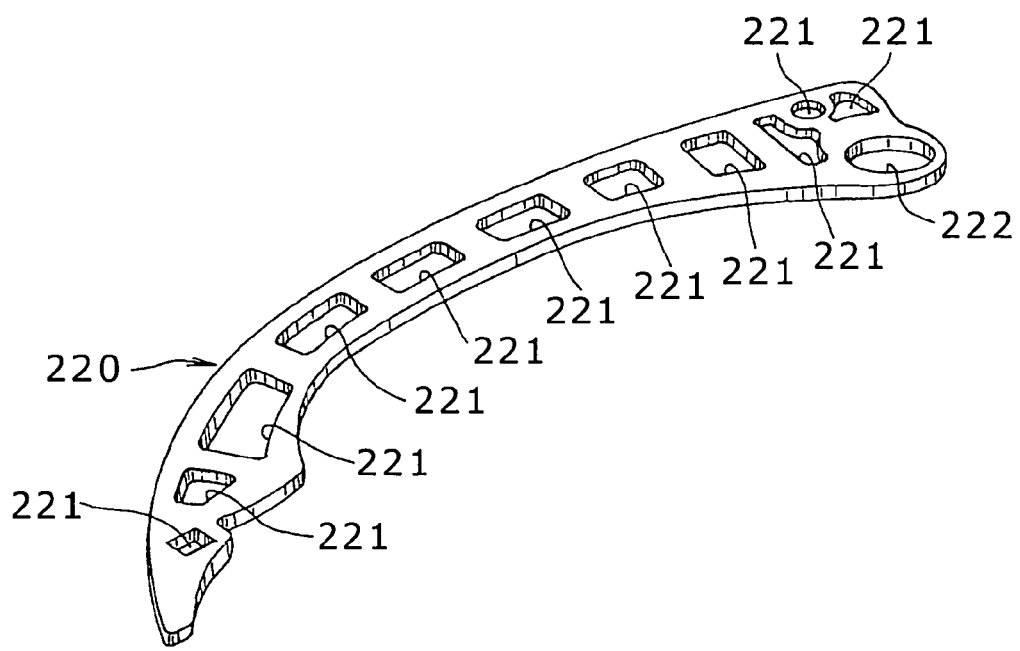

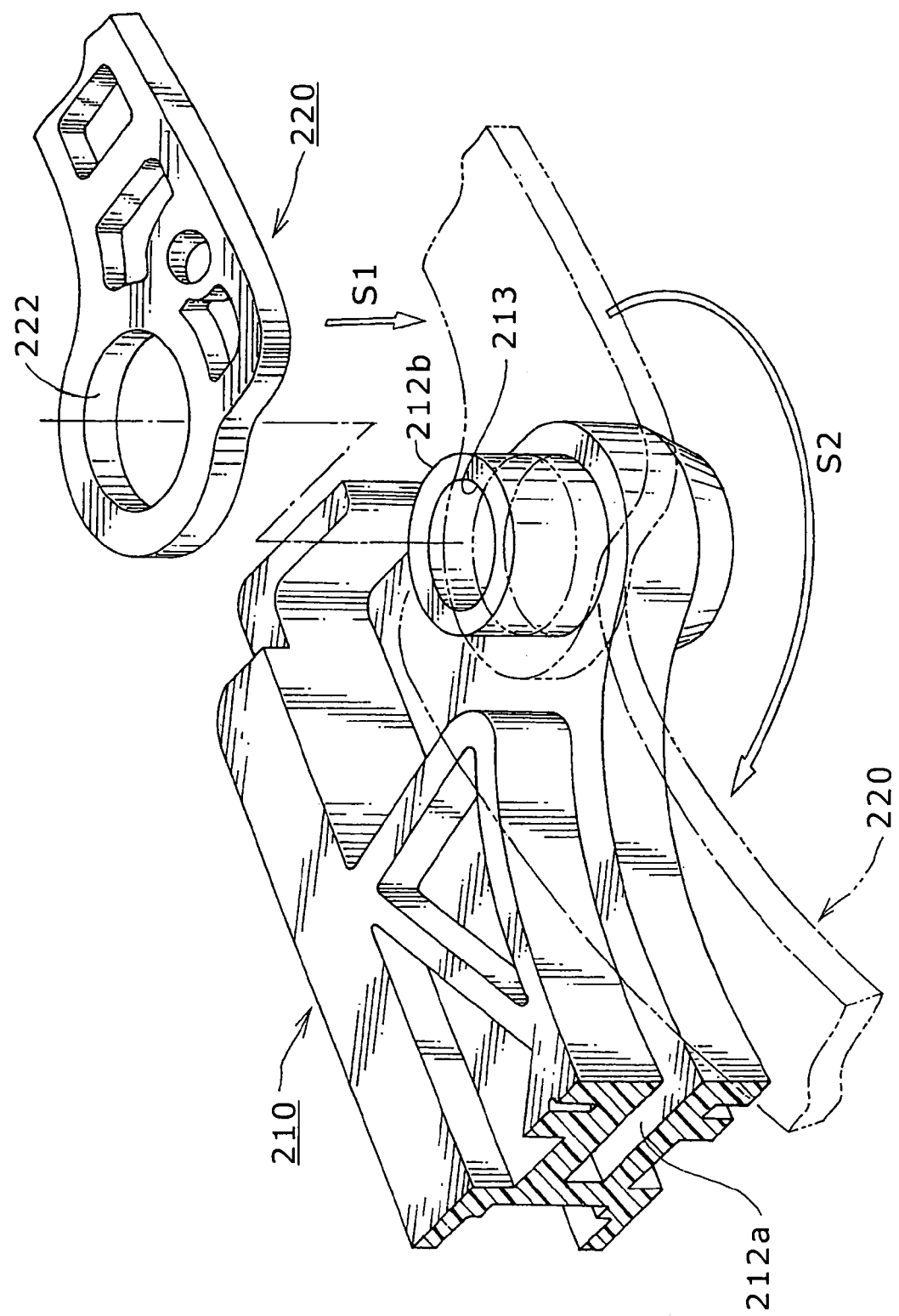

MOVABLE GUIDE FOR TRANSMISSION DEVICE

FIELD OF THE INVENTION

This invention relates to a movable guide for a transmission device, in which power is transmitted from a driving sprocket to a driven sprocket through a circulating, endless, flexible, transmission medium such as a chain or a belt.

BACKGROUND OF THE INVENTION

Most internal combustion engines, and also some other machines utilizing drive mechanisms, utilize a transmission, in which power is transmitted through a chain or belt. In such a transmission, a movable guide is typically provided in sliding contact with the transmission medium in order to maintain proper tension and to prevent vibration, both in the plane of circulation of the transmission medium and in directions transverse to its plane of circulation. The movable guide is attached to the frame of the engine or other drive mechanism on a mounting shaft consisting of a bolt, a pin, or the like.

FIGS. 11 and 12 show a plastic movable guide G, used in a chain transmission. This guide is described in Japanese laid-open patent publication No. 2002-266964. The guide G comprises a guide body G3 and a plate G5. The guide body G3 is manufactured by integrally molding a shoe G1, adapted for sliding contact with a chain, and a reinforcing structure G2, which extends along the longitudinal direction of the guide. The plate G5 is a steel sheet, which fits into a slot G4 formed between two opposed parts of the reinforcing structure G2, in order to achieve weight reduction while ensuring strength of the guide and rigidity against bending, and in order to facilitate assembly of the guide. In mounting the guide G on a fixed frame, the guide G is attached to the frame by a bolt type pivot shaft B, which extends through mounting hole G6 in the plastic guide G, and through hole G7 in the plate G5.

In the conventional plastic guide, as shown in FIG. 12, the plate G5 is forcibly fitted into the slot G4 so that it is sandwiched between the two opposed parts of the reinforcing structure G2. Thus, the mounting holes G6 and G7, formed respectively in the reinforcing structure G2 and the plate 5, are often initially not in alignment with each other when the combination of the guide body and plate is mounted on the pivot shaft B. In order to align the holes, the plate must be shifted. The needed shift of the plate may be effected by the action of a tapered section formed on the pivot shaft provided that the misalignment does not exceed the distance X depicted in FIG. 12. However, if the holes are too far misaligned, an abutment will take place, preventing the engagement of the guide with the pivot shaft.

When a guide in which the mounting holes G6 and G7 are excessively misaligned is mounted on a frame F, the pivot shaft B abuts a portion of a side of plate G5 adjacent the circumferential edge of the hole G7, and therefore cannot be pushed through the holes G6 and G7. Accordingly, it was necessary to adjust the position of the hole G7 in order to align it with hole G6 and thereby allow the pivot shaft B to be moved through both holes and threaded into to the frame F. The structure depicted in FIGS. 11 and 12, therefore, has the disadvantage that an additional alignment step is required in order to mount the guide on its pivot.

Furthermore, even if the mounting holes G6 and G7 of the guide body and the plate are not excessively misaligned, and the pivot shaft B is forced through the mounting holes, the synthetic resin reinforcing structure G2 tends to break at the location of hole G6, and the difference between strengths of the guide body G3 and the plate G5 produces biased wear of the guide body G3, which impairs the sliding contact function of the guide and also shortens its useful life.

Another problem, with the movable guide of FIGS. 11 and 12, is that, in order to achieve a smooth pivoting action as the guide takes up slack in a chain, it is necessary to supply lubricating oil to the mounting hole G7 in the plate G5. However, maintaining adequate lubrication at the location of mounting hole G7 is difficult.

Accordingly, an object of the invention is to solve the above-described problems of the conventional movable guide, and, more particularly, to provide a movable guide which can be easily and reliably assembled from a synthetic resin guide body and a reinforcing plate, and mounted on the frame of the transmission device. Another object of the invention is to provide a movable guide which can avoid biased wear as it guides a traveling chain or other flexible power transmission medium, and thereby operate reliably over a long period of time.

SUMMARY OF THE INVENTION

The plastic movable guide in accordance with the invention comprises a unitary guide body composed of a synthetic resin, and a plate fitting into a slot in the guide body. The guide body comprises an elongated shoe having a surface on one side thereof adapted for sliding engagement with a traveling flexible transmission medium, and a reinforcing structure on the opposite side of the shoe and extending along the direction of elongation of the shoe. The reinforcing structure has a slot also extending along the direction of elongation of the shoe, the slot being open in a direction facing away from the shoe. The guide body and the plate respectively have circular holes disposed adjacent one end of the elongated shoe. These holes are coaxial with each other on an axis extending in a direction transverse to the direction of elongation of the shoe and to said direction facing away from the shoe. The hole of the guide body extends coaxially through a boss formed on the guide body and having a circular exterior surface. The boss, in turn, fits into the circular hole of the reinforcing plate so that a mounting shaft on which the guide can be pivoted can extend through the circular holes of the guide body and the reinforcing plate without contacting the reinforcing plate.

In a preferred embodiment, the axial length of the hole in the guide body is greater than the width of the shoe measured in a direction parallel to the axis of the holes.

The material from which the synthetic resin guide body is composed is preferably an engineering plastics material such as a polyamide resin, and may be fiber-reinforced. Such resins exhibit excellent wear resistance and lubricating properties, and are both suitable for use as the material of the chain-engaging shoe, and light in weight. However, various other synthetic resins may be used as materials for the guide body.

For the plate, ferrous metals, non-ferrous metals, engineering plastics, fiber-reinforced plastics, and the like are preferred, but any of various materials having suitable strength and bending properties may be used.

The mounting shaft oh which the guide is pivoted is fastened to the frame of a transmission device. The mounting shaft may be any of a variety of bolts, pins, or the like, and may be either previously mounted on the frame before attachment of the guide, or secured to the frame in the process of mounting the guide.

Since the boss on the guide body fits into a circular hole in the plate, the guide body and the plate can be pre-assembled with the plate fitting in the slot of the guide body, in such a way that the plate and guide body will not come apart from each other before or during mounting of the guide on the mounting shaft, and problems due to misalignment of the mounting holes are avoided.

Since the mounting shaft contacts only the interior of the boss on the synthetic resin guide body, especially if the boss itself is composed of a self-lubricating synthetic resin, the guide can pivot smoothly as the tension in the transmission medium sliding on the shoe of the guide varies.

Furthermore, if the boss is formed so that the hole in the guide body, which receives the mounting shaft, is longer than the width of the shoe, even if snaking of the chain results in a biased load on the guide, acting in the direction of the width of the shoe, the load is dispersed so that wear in the mounting hole of the guide body is suppressed.

BRIEF DESCRIPTION OF THE DRAWINGS

FIG. 3 is an exploded view of a portion of movable guide of FIG. 1, illustrating the manner in which the guide is assembled;

FIG. 6 is a perspective view of an assembled movable guide in accordance with another embodiment of the invention;

FIG. 7(a) is a perspective view of the synthetic resin body of the guide of FIG. 6;

FIG. 7(b) is a perspective view of the reinforcing plate of the guide of FIG. 6;

FIG. 8 is an exploded view of a portion of movable guide of FIG. 6, illustrating the manner in which the guide is assembled;

DETAILED DESCRIPTION OF THE PREFERRED EMBODIMENTS

Figure 4:
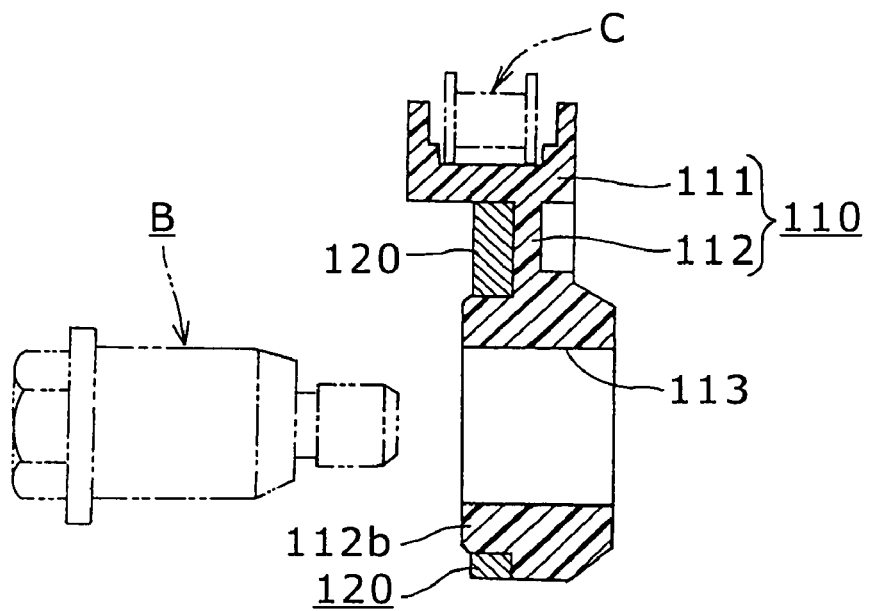
FIG. 4 is a cross-sectional view taken on plane IV—IV in FIG. 1, also showing a mounting bolt on which the guide is to be pivoted and a chain in engagement with the guide.
Figure 5:
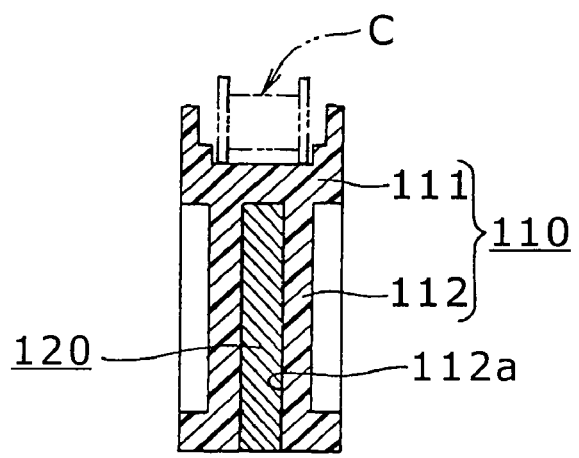
FIG. 5 is a cross-sectional view taken on plane V—V in FIG. 1, also showing the chain.

In the first embodiment of the invention, shown in FIGS. 1–5, a movable guide 100, of the kind used to maintain tension in the valve timing chain of an automobile engine, is pivoted on a frame of the automobile engine by a bolt B (FIG. 4). The pivoting movement of the guide on the bolt B is dependent on the tension in the timing chain. The guide 100 comprises, as its principle components, a synthetic resin guide body 110 and a plate 120, which reinforces the guide body.

Figure 1:
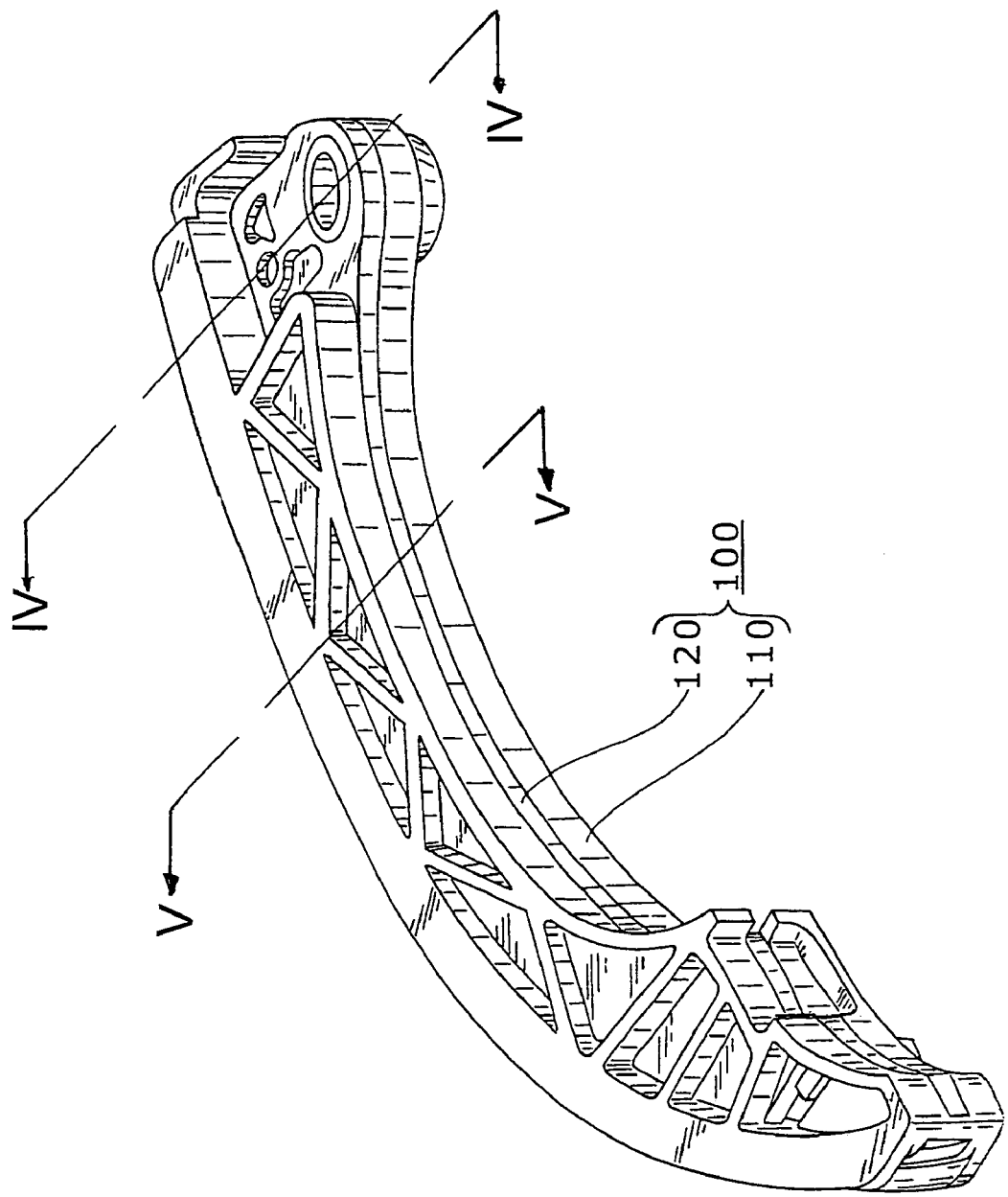
FIG. 1 is a perspective view of an assembled movable guide in accordance with one embodiment of the invention.
Figure 2A:
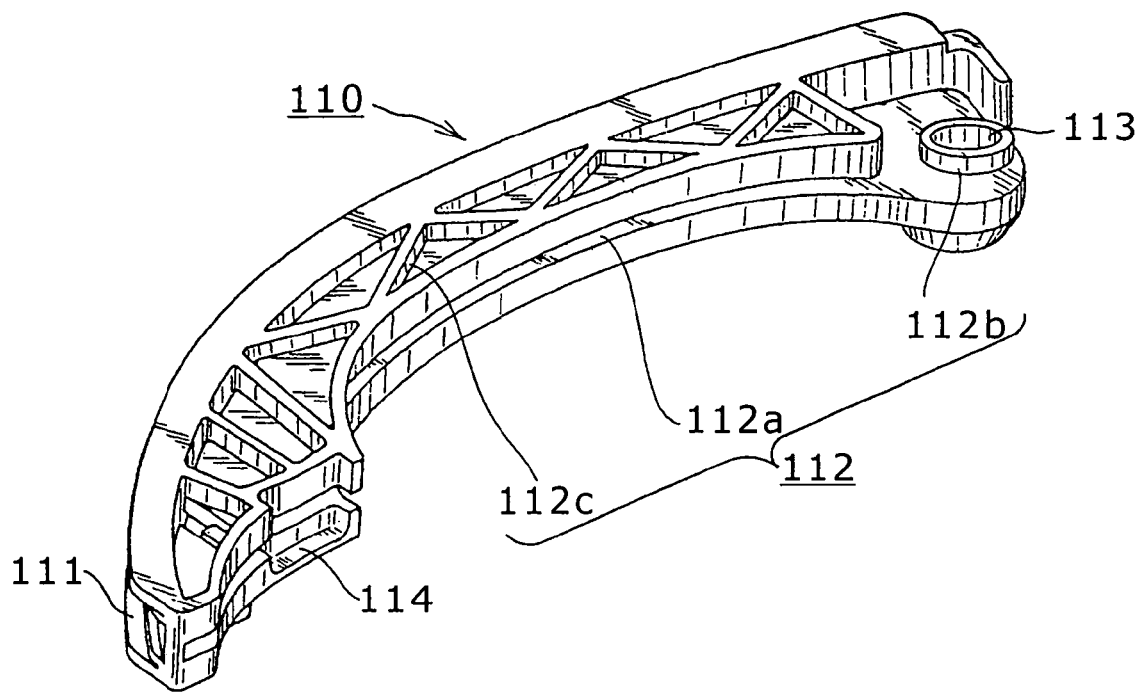
FIG. 2(a) is a perspective view of the synthetic resin body of the guide of FIG. 1.

As shown in FIG. 2(a), the synthetic resin guide body 110 is integrally molded from a polyamide resin or the like, and comprises an elongated shoe 111, having a front surface on which a traveling chain slides, and a supporting and reinforcing structure 112 on the back of the shoe, and extending lengthwise along the shoe.

A slot 112a is formed in the reinforcing structure. The slot extends along the longitudinal direction of the guide, and its opening faces in a direction opposite to the direction in which the chain-engaging front surface of the shoe faces. A mounting hole 113 for pivotally receiving a mounting shaft, is provided adjacent a proximal end of the guide.

The mounting hole 113, which receives the mounting bolt B, extends through a portion of the reinforcing structure 112 on one side of the slot 112a, and through bosses extending from both sides of that portion of the reinforcing strucure. One of the bosses, on the frame side of the reinforcing structure, protrudes to such an extent that the shoe 111 does not contact the frame of the engine. The other boss, 112b, protrudes past the slot in the opposite direction, so that it can extend through a hole in the plate 120 and secure the plate to the guide body.

As shown in FIG. 2(a), ribs 112c are formed in the reinforcing structure 112 for reinforcing the synthetic resin guide body 110. The reinforcing ribs 112c may take any of various forms including a truss shape, a ladder shape, a nerve shape, and the like. A tensioner contact portion 114 is provided near a distal end of the guide as shown in FIG. 2(a).

Figure 2B:
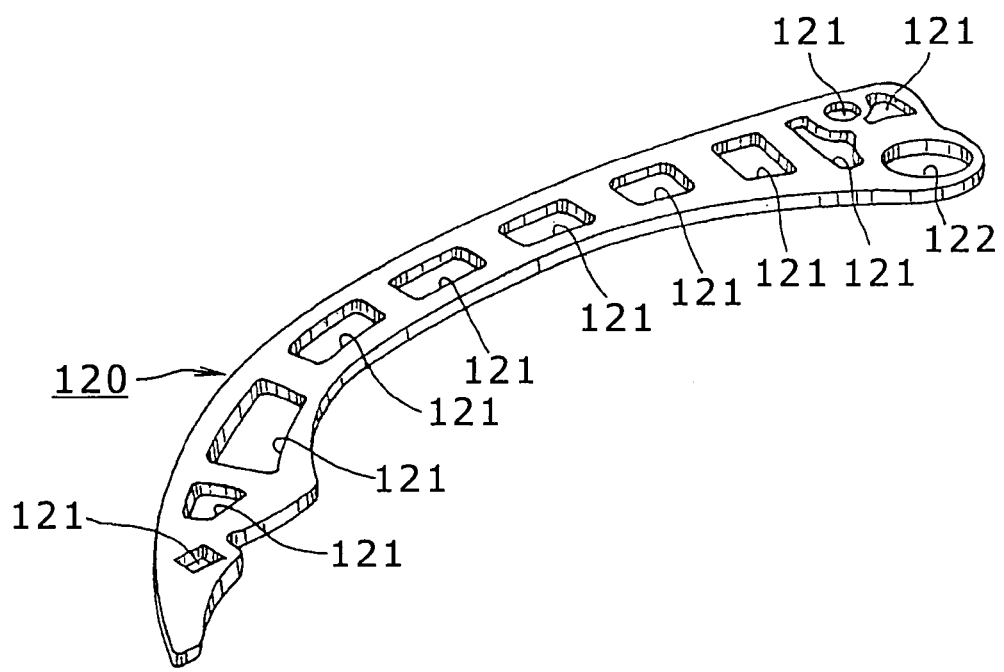
FIG. 2(b) is a perspective view of the reinforcing plate of the guide of FIG. 1.

As shown in FIG. 2(b), the plate 120 is provided with a plurality of punched windows 121 distributed along the longitudinal direction of the guide. As shown in FIG. 3, the boss 112b fits into a circular hole 122 provided adjacent the proximal end of the plate 120.

The movable guide 100 is assembled by arranging the plate 120, as shown in FIG. 3, so that its hole 122 is aligned with hole 113 of the guide body, while the plate extends from the common axis of the holes in a direction opposite to the direction in which the guide body extends. The plate is then moved laterally, in the direction indicated by arrow S1, so that the boss 112b of the guide body enters hole 122 in the plate. When the boss is fully engaged with hole 122, the plate becomes aligned with slot 112a and is then rotated about the boss, in the direction indicated by arrow S2, so that it enters the slot.

The guide 100 may then be mounted on the frame of an engine or transmission device by fitting it onto a pivot shaft, such as bolt B in FIG. 4. The pivot shaft may be previously secured to the frame, or as shown in FIG. 4, the shaft may be inserted through the hole 113 in the synthetic resin guide body, and then secured in place by threading it into the frame. The shaft does not contact the inner periphery of the hole 122 in plate 120. The guide pivots smoothly on the shaft by taking advantage of the self-lubricating property of the synthetic resin from which the resin body is formed.

The plate is held in place in the guide body by fitting into the slot 112a, and, when the guide is installed in cooperative relationship with a tensioner (not shown) removal of the plate from the slot is blocked by the tensioner.

The movable guide 100 can be easily and reliably assembled and installed by engaging the boss with the hole in the plate, rotating the plate so that it enters the slot in the guide body, and then mounting the assembly by fitting it onto a pivot shaft.

Figure 9:
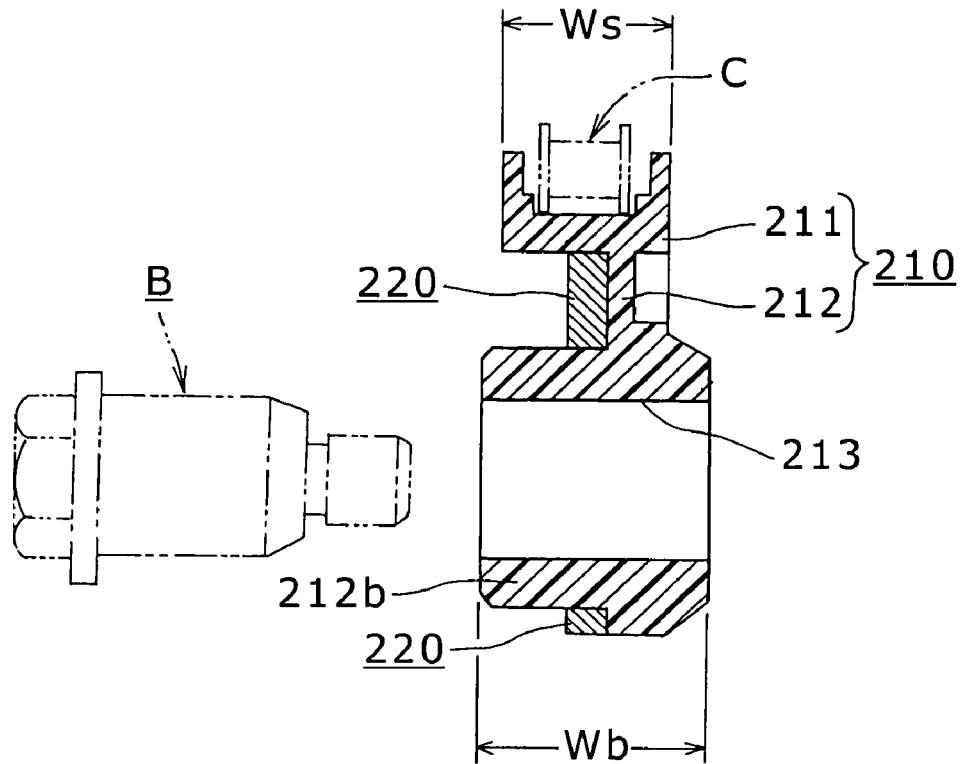
FIG. 9 is a cross-sectional view taken on plane IX—IX in FIG. 6, also showing a mounting bolt on which the guide is to be pivoted and a chain in engagement with the guide.
Figure 10:
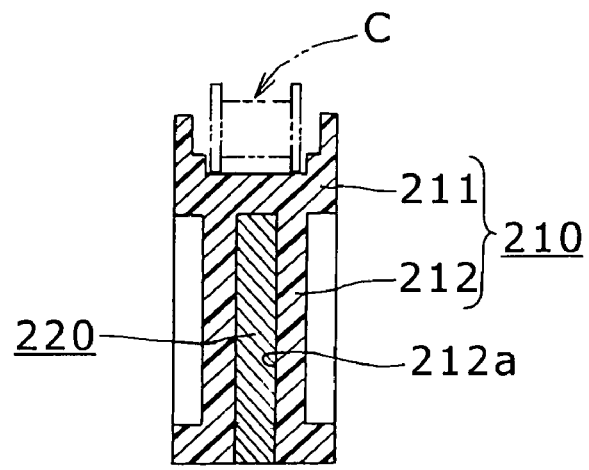
FIG. 10 is a cross-sectional view taken on plane X—X in FIG. 6, also showing the chain.
Figure 11:
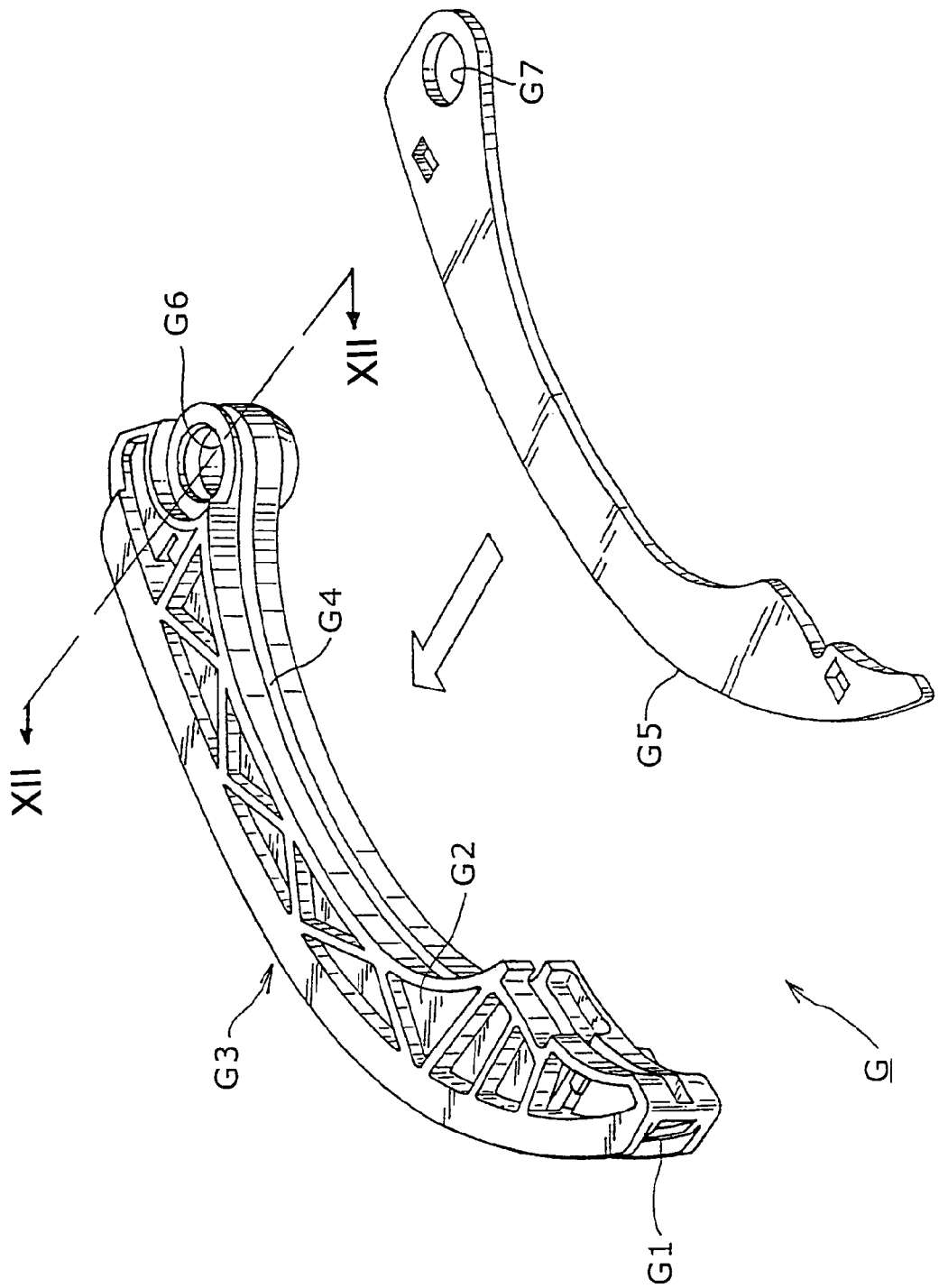
FIG. 11 is a perspective view of a conventional movable guide.
Figure 12:
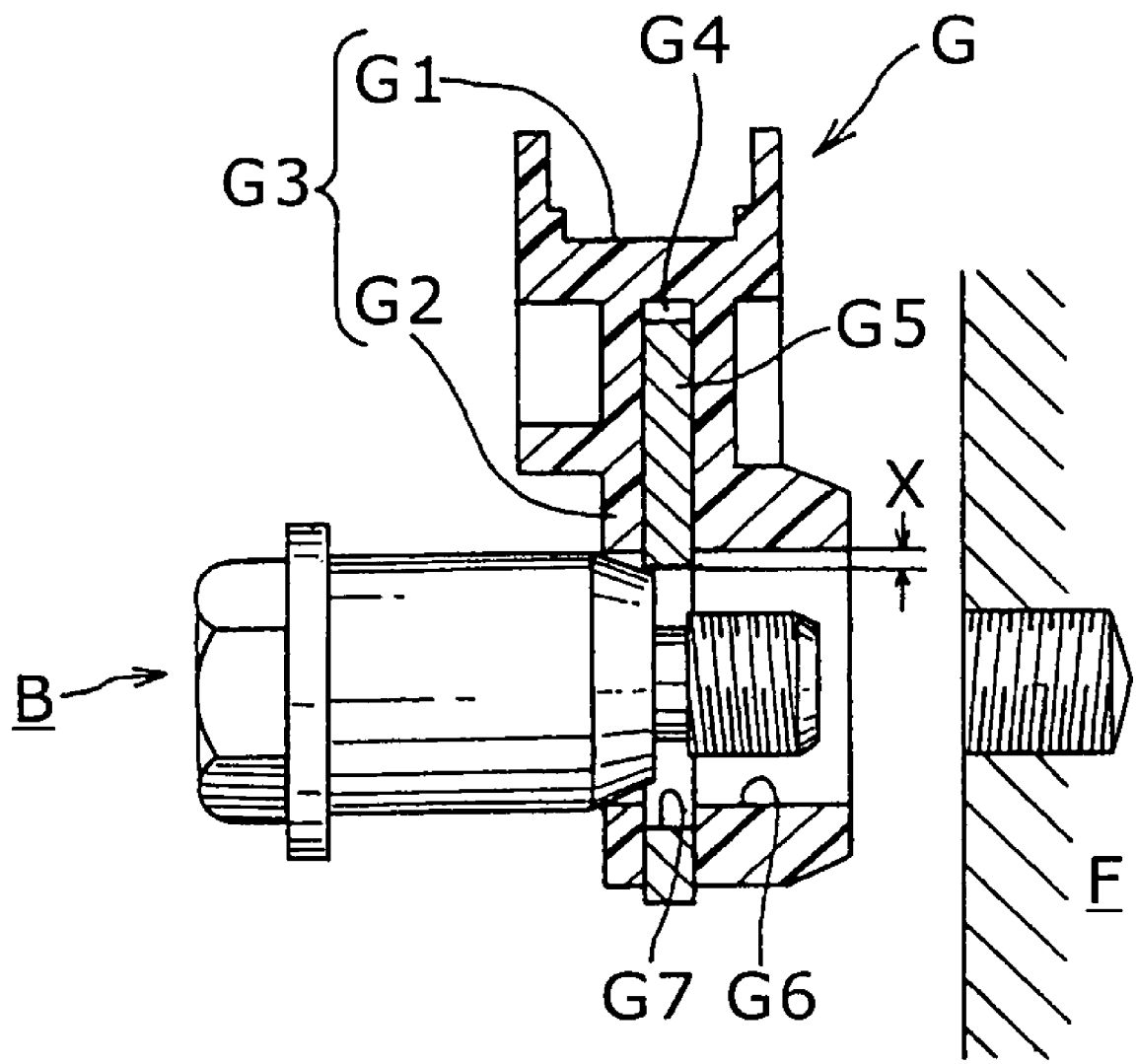
FIG. 12 is a cross-sectional view taken on plane XII—XII in FIG. 11.

The alternative movable guide 200, shown in FIGS. 6 to 10 is also mounted on a pivot shaft, which can be a bolt B, as shown in FIG. 9. Like the movable guide 100, guide 200 comprises a synthetic resin guide body 210 and a plate 220, the guide body comprising a shoe 211 having a chain-engaging front face, and a reinforcing structure 212 extending along the longitudinal direction of the guide on the back of the shoe. A longitudinal slot 212a having an opening facing away from the back of the shoe, receives the plate 220, and a mounting hole 213 is provided with a boss 212b.

On the side of the guide that faces the frame (not shown) of an engine or other transmission device, a boss protrudes to an extent such that the shoe 211 does not contact the frame. On the opposite side of the proximal end portion of the guide body, and the other slot-formed side in a boss 212b protrudes through the plate 220. In this embodiment, the boss 212 is longer than boss 112b in FIG. 4, and extends past the side of the shoe that is disposed farthest from the frame on which the guide is mounted.

As shown in FIG. 9, the length Wb of the hole 213 is greater than the width Ws of the shoe 211. Therefore, even if a biased load results from snaking of the chain during the operation of the engine or other transmission, the load is dispersed over a larger surface area, normally the entire inner surface of the hole 213. Consequently, wear, which is liable to occur in the mounting hole 213, is suppressed.

As shown in FIG. 7(a), the reinforcing structure has It ribs 212c, which reinforce the synthetic resin guide body 210. Here as in the case of the previously described embodiment, the arrangement of the ribs can take any of various forms including a truss shape, a ladder shape, a nerve shape and the like. The reinforcing structure also has a tensioner contact portion 214. As shown in FIG. 7(b), the reinforcing plate 220 is provided with a plurality of punched windows 221 distributed along the longitudinal direction of the guide. The boss 212b of the synthetic resin guide body, which has a circular exterior surface fits into circular hole 222 provided near the proximal end of the plate 220.

Assembly and mounting of the guide of FIGS. 6–10 are carried out in the same manner as the assembly and mounting of the guide of FIGS. 1–5. The plate is held in place in the guide body in the same manner, and the shaft contacts only the interior wall of the hole 213 of the guide body, and not the hole 222 of the plate 220. Consequently the guide can pivot smoothly by taking full advantage of the self-lubricating property of the synthetic resin of which the guide body is composed.

Furthermore, since the boss 212b protrudes beyond the side of the shoe, the length Wb of hole 213 is greater than the width Ws of the shoe 211, resulting in suppression of wear due to biased load imposed on the guide by a traveling chain or other guided flexible transmission medium.

As in the case of the embodiment of FIGS. 1–5, the guide of FIGS. 6–10 can be assembled and mounted easily and reliably. Moreover, because the embodiment of FIGS. 6–10 is better able to suppress wear, its useful life is extended significantly.

In summary, the movable guide of the invention has several important advantages. First, the guide can be assembled and mounted more easily because the guide body and the plate are held together by virtue of engagement of the boss with the mounting hole in the plate before the guide is mounted on a pivot shaft. Second, since the hole of the mounting plate is engaged with the boss on the reinforcing structure of the guide body, mounting problems and damage due to misalignment of the mounting holes are eliminated. Third, since the pivot shaft contacts only the wall of the hole in the synthetic resin guide body, and not the inner periphery of the hole in the plate, full advantage may be taken of the self-lubricating property of the synthetic resin, and smooth pivoting can be realized over a long period of time. Furthermore, in the case in which the boss on which the mounting hole in the plate is received is elongated so that length of the hole that receives the pivot shaft is greater than the width of the shoe, wear due to a biased load is suppressed, and the useful life of the guide is extended significantly.

What is claimed is:

1. A plastic movable guide for a transmission device comprising:

a unitary guide body composed of a synthetic resin, the guide body comprising an elongated shoe having a surface on one side thereof adapted for sliding engagement with a traveling flexible transmission medium, and a reinforcing structure on a side of the shoe opposite said one side thereof and extending along the direction of elongation of said shoe, said reinforcing structure having a slot also extending along the direction of elongation of the shoe, the slot being open in a direction facing away from said shoe;

a plate fitting into said slot of said synthetic resin guide body;

wherein the guide body and the plate respectively have circular holes disposed adjacent one end of the elongated shoe, said holes being coaxial on an axis extending in a direction transverse to said direction of elongation of the shoe and to said direction facing away from the shoe; and wherein said hole of the guide body extends coaxially through a boss having a circular exterior surface, said boss being formed on said guide body; and wherein said boss fits into the circular hole of the reinforcing plate;

whereby a mounting shaft on which the guide is pivoted extends through the circular holes of the guide body and the reinforcing plate without contacting the reinforcing plate.

2. A plastic movable guide according to claim 1, in which the axial length of the hole in the guide body is greater than the width of the shoe, measured in a direction parallel to said axis.

* * * * *